April 21, 1931. H. R. MADDOCKS 1,801,966
VACUUM CLEANING APPARATUS
Filed Aug. 14, 1926 3 Sheets-Sheet 3
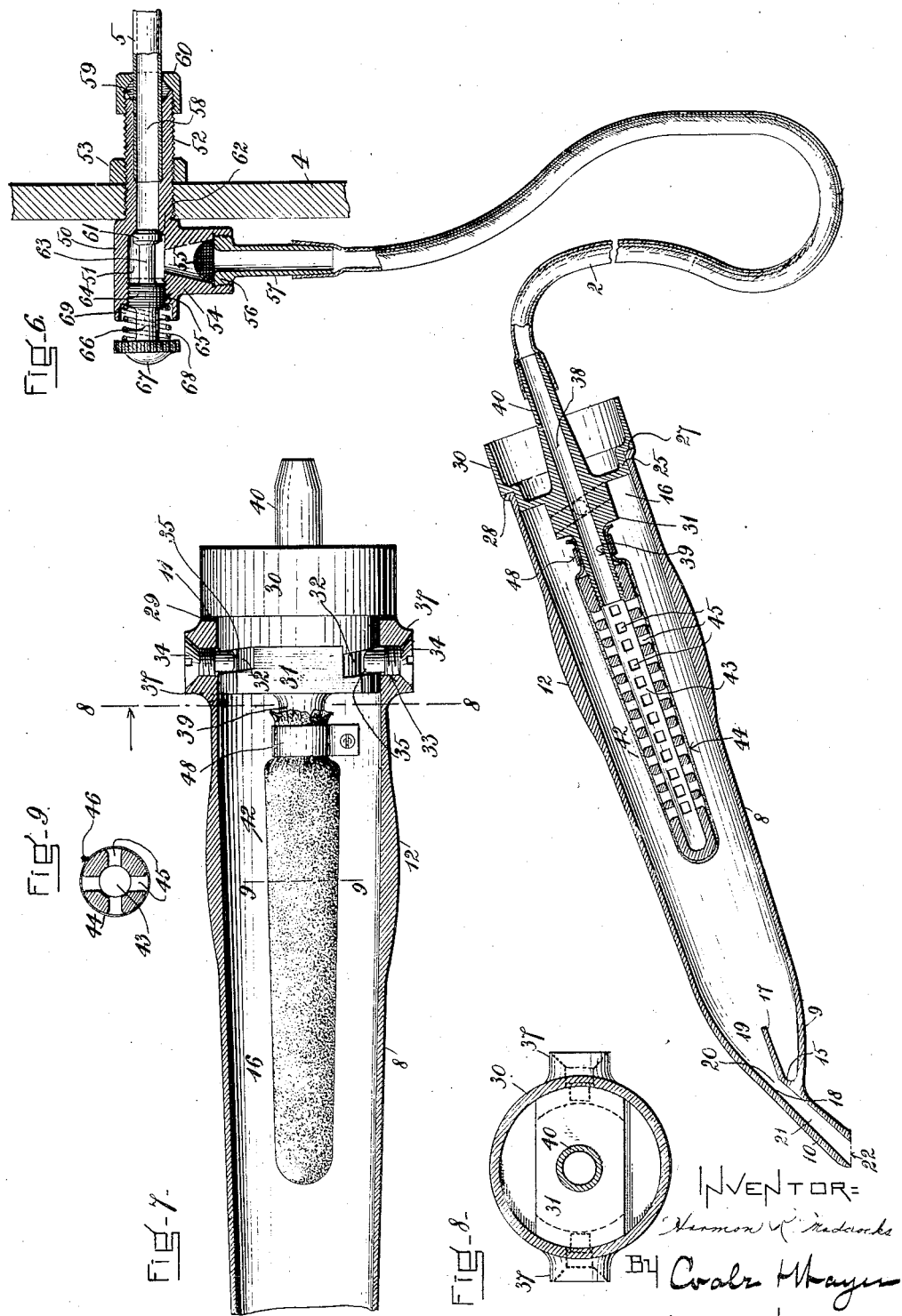

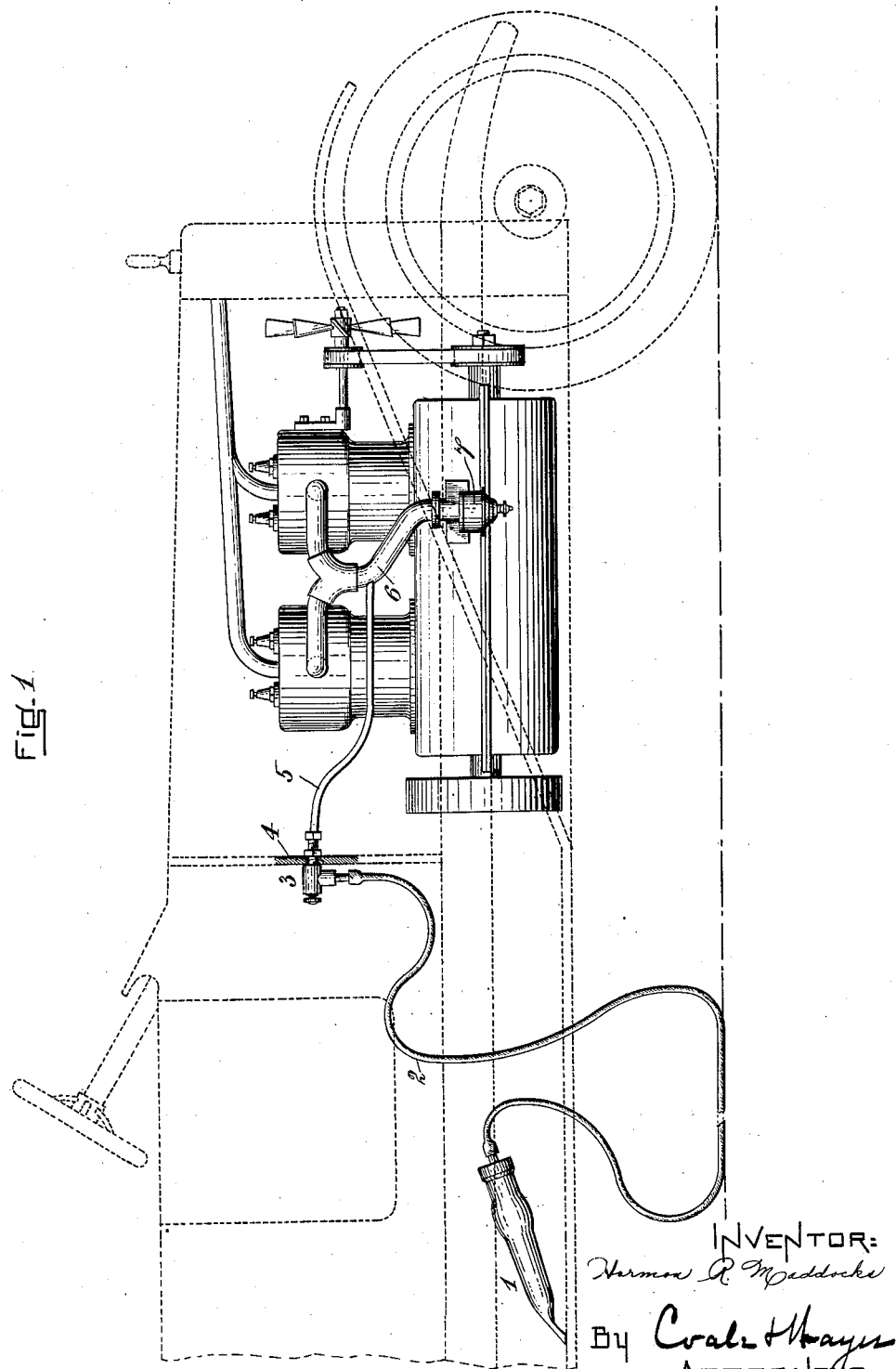

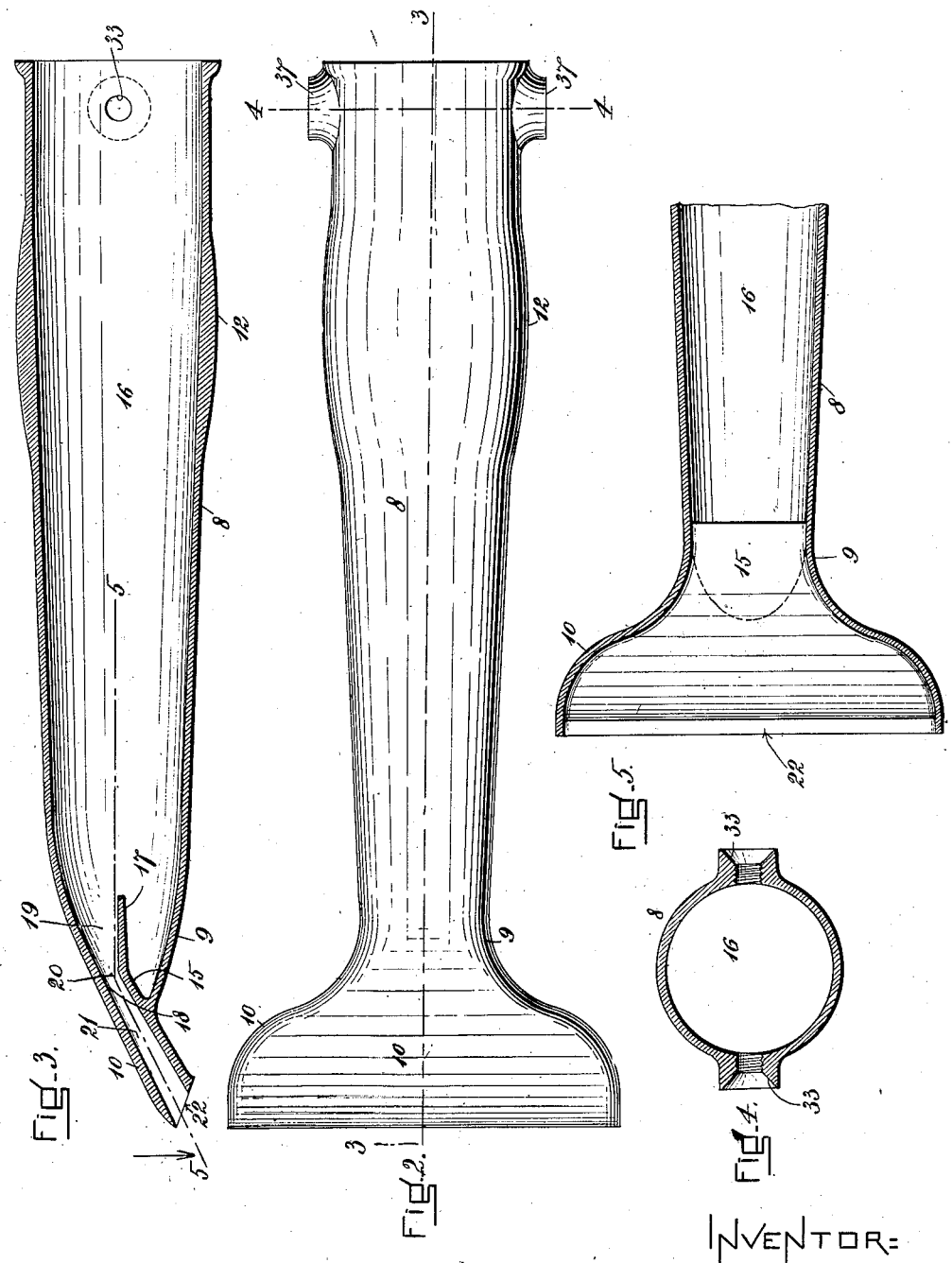

Patented Apr. 21, 1931

1,801,966

UNITED STATES PATENT OFFICE

HARMON R. MADDOCKS, OF WINCHESTER, MASSACHUSETTS, ASSIGNOR TO DEVICES-CORPORATION, OF CAMBRIDGE, MASSACHUSETTS, A CORPORATION OF MASSACHU-SETTS

VACUUM CLEANING APPARATUS

Application filed August 14, 1926. Serial No. 129,237.

The invention relates to an improvement in vacuum cleaning apparatus of a type essentially adapted for cleaning the upholstery of automobile bodies, and in which the vacuum is produced by the operation of the automobile engine.

Among the objects of the invention is to provide an improved vacuum cleaning apparatus capable of developing at the nozzle mouth a maximum of draft or suction from a partial vacuum produced in a combined dust and vacuum chamber lying back of the nozzle; to provide an arrangement whereby dust or dirt drawn into the dust chamber will not escape back through the nozzle whatever the position may be into which the nozzle is turned; to provide an improved type of end piece or closure for the combined dust and vacuum chamber capable of being quickly applied or removed and when in place making an absolutely tight joint with the body of the chamber; to provide an improved type of dust separator within the dust chamber; to provide the apparatus with an improved type of valve fixture capable of convenient location on some part of the body of the automobile as the dash; and to provide an apparatus of the above general character capable of great efficiency though economical in structure, and which will maintain its efficiency for a long time without possibility of getting out of order. For purpose of illustration the apparatus is shown in operative connection with the manifold of an internal combustion automobile engine and can best be seen and understood by reference to the drawings, in which—

Figure 1 is a view mainly in side elevation of an automobile fitted with the improved apparatus, such portion of the automobile only being shown as is necessary for a proper understanding of the apparatus.

Fig. 2 is a plan of the suction member.

Fig. 3 is a section on line 3—3 of Fig. 2.

Fig. 4 is a section on line 4—4 of Fig. 2.

Fig. 5 is a section on line 5—5 of Fig. 3.

Fig. 6 is a view in enlarged vertical section of separate connected portions of the apparatus including the suction member and its associated parts, and the fixture applied to the dash of the automobile.

Fig. 7 is a horizontal section in enlarged detail of that portion of the suction member which comprises its combined vacuum and dust chamber showing especially its end piece or closure and attached dust separator, the end piece and dust separator being shown in side elevation.

Fig. 8 is a section on line 8—8 of Fig. 7, and

Fig. 9 is a section on the line 9—9 of Fig. 7.

Referring to the drawings, the device in a general way is characterized by a suction member 1 which connects by a pipe connection 2 with a fixture 3 located on the dash 4 of the automobile, the connection between the pipe 2 and the fixture being made inside the dash. The fixture 3 extends through the dash and, on the exterior side of the dash, connects by a pipe 5 with the manifold 6 of the automobile engine, the connection to the manifold being made at a point beyond the carburetor 7. The pipe connection 2 is a flexible connection and makes a removable connection with the fixture 3, being attached only when the suction member is in use. The pipe connection 5, however, is preferably a permanent connection consisting of metal tubing.

The suction member 1 is made of metal. It comprises a chambered body 8, neck 9 and nozzle 10, while 11 represents an attachable end piece which closes the rear end to the chamber of the body and with which the pipe 2 connects.

The body 8 is generally tubular in form and just forward of its rear end the metal is preferably thickened to form a hand grip 12. At the forward end of the suction member the neck 9 is formed by contracting the body 8, the general tubular form of the body being continued in the neck. Forward of the neck the metal is drawn to form a flattened, angularly turned nozzle 10, flaring outwardly at either side, the width of the nozzle gradually increasing from the neck. Within the neck on the under side thereof substantially at the point where the neck joins the nozzle, it is provided with an internal plate or diaphragm 15, which crosses the interior of the neck or throat, connecting with the opposite sides thereof, and extend upwardly and backwardly through the neck into the fore end of the chamber to the body. The plate 15 co-operates with the adjacent exterior top wall of the neck to form a constricted opening in the neck with passage leading to and from this opening.

The body 8 of the suction member forms within it a combined vacuum and dust chamber 16 open at its rear end and gradually contracting towards its forward end. At the forward end of the chamber a portion 17 of the plate 15 co-operates with the wall forming the neck 9 along the top portion 18 thereof to form a passage 19 gradually diminishing in area as it leads out of the chamber 16 of the body and leading to a constricted opening 20 in the neck formed between the plate 15 and the adjacent top wall 18 of the neck. Beyond the constricted opening 20 in the neck the plate 15 assists in forming a passage 21 gradually increasing in area which leads outwardly through the neck and through the nozzle emerging at the point 22 which forms the mouth of the nozzle. It will be observed in connection with the plate 15 that this plate assists in forming the constricted opening 20 in the neck with passages 19, 21 gradually diminishing in area leading thereto from the interior of the nozzle and chamber of the body of the suction member, respectively. The plate 15 forms also another useful function, but to this reference will be made at a later point. The essential purpose of the plate, however, is to form the constriction in the neck with the passages leading to and from it as aforesaid, for it has been found that with a neck characterized by such constricted opening with a passage gradually lessening in area out of the vacuum chamber as it leads to the opening, and gradually increasing in area from the constricted opening outwardly through the nozzle to the mouth of the nozzle very material improvement is obtained in the efficiency of the nozzle. While the invention is concerned with matter of principle rather than mere dimensions yet certain dimensional areas will be given as a suction member equipped with such areas has proved exceedingly efficient. For example, with a suction member about the size of that shown in Figs. 2 and 3 of the drawings, the constricted opening 20 in the neck has a cross sectional area of about .1125 square inches. At a point immediately beyond the end 17 of the plate 15 the cross sectional area of the vacuum chamber is about 0.725 square inches. The entrance to the passage 19 leading out from the vacuum chamber to the constricted opening in the neck is about 0.25 square inches. Just beyond the constricted opening in the direction of the mouth of the nozzle the passage 21 has a cross sectional area of about 0.165 square inches. This same passage extending downwardly through the nozzle has a cross sectional area of about 0.425 square inches at a point a short distance inwardly removed from the mouth of the nozzle while the mouth of the nozzle has a cross sectional area of about 0.586 square inches. With a suction member thus formed and used under an 18-inch vacuum an air velocity of about 475 feet per second is developed at the entrance to the passage 19, about 1000 feet per second at the point of the constricted opening in the neck, and about 200 feet per second at the mouth of the nozzle.

The end piece 11 which closes the rear end of the suction member 1 and opening to the chamber 16 of its body 8 is made of metal and its various parts to which attention will now be directed are preferably integral. The end piece comprises a cylindrical portion 25 which fits within the open end of the chamber 16 of the body 8 and operates to centre the end piece with relation to the said body in the end of which it fits. Extending from the cylindrical portion 25 is a flange 26 presenting an edge 27 which bears against the rear edge 28 of the body 8. The edges 27 and 28 when in engagement form an air tight joint, or a washer 29 of some elastic material may be arranged in the barrel of the portion 25 and interposed between these edges. The flange 26 is reinforced by a turned edge or rim 30.

The cylindrical portion 25 of the end piece is extended on its front end by a block extension 31 which is provided on its opposite ends with one or more slots 32. These slots extend at an angle with relation to the longitudinal centre of the body 8 when the end piece is in place. At points opposite where these slots occur when the end piece is in place, the body 8 is provided with threaded holes 33 through which extend screws 34, the ends 35 of which are adapted to enter the respective slots and receive the bearing of the sides of said slots acting as cams when the end piece is turned on the body 8. The parts, in other words, co-operate to form a very powerful screw so that as the end piece is turned on the body it will be drawn against and into the body, the flange edge 27 thereof being drawn tightly against the edge 28 at the rear end of the body forming a tight joint, a washer being interposed if desired, although in practice this is found unnecessary. The end piece is released simply by a reverse turning of it on the body 8 when the ends of the screws or pins 34 will turn out of the slots permitting withdrawal of the end piece from the body. The pins 34 are enabled to turn out of the slots by reason of the substantially rectangular formation of the block extension 31, the slots therein not being continuous slots by reason of the removal of the sides of the extension. Inasmuch as the angle of the slots 32 is slight, the walls thereof having a relatively slight inclination with relation to the longitudinal centre of the body 8 when the end piece is in place, the end piece when tightened will maintain its position and will not loosen until a determinate action is taken to this end.

It is also to be observed that the body 8 is provided with bosses 37 within which the heads of the respective screws are sunk when the screws have been full turned down, the tops of the screws being then substantially flush with the tops of the bosses, or preferably slightly countersunk with relation to them.

The end piece has a central opening 38 through it from end to end and this opening is extended through pipe sections 39 and 40, respectively, with which the end piece is provided. The pipe section 39 extends from the block extension 31 with forward projection therefrom into the chamber 16 of the body 8 of the suction member and attached to it is a dust separator 42. The pipe section 40 extends back from the cylindrical portion 25 of the end piece with extension sufficient to receive the attachment of the pipe 2 which is simply fitted or drawn over the end of this pipe when the passage through the end piece will be continued through the pipe.

The dust separator 42 comprises a hollow perforated form 43 in the nature of a grid attached by threaded connection to the pipe section 39 of the end piece and over which form is fitted a cover or bag 44 of chamois skin or other suitable material which will permit of the passage of air through it but will exclude dust. The form 43 is made of metal, solid in structure, inelastic, and preferably tubular in form with extension for some distance into the chamber 16 when in place. Its outer end is closed while its inner end fits over and makes a threaded connection with the fore end of the pipe section 39 of the end piece. Along its sides the form is provided with separate lines or rows of perforations 45, these perforations being relatively small individually, while collectively covering a considerable area. The cover or bag 44 is preferably formed by a stitching 46 along its side. Its inner open end is turned over and around the inner end of the form and then wrapped around the pipe section 39 to which it is tightly secured by means of a clamp 48. In the operation of the apparatus as the air is drawn through the dust separator considerable strain will be brought to bear upon the flexible cover or bag 44 but owing to the nature of the form over which the bag is fitted this strain is reduced to a minimum, inasmuch as the solid nature of the form, the smallness of its perforations, and the fact that the line of stitching 46 by which the bag is formed, may be arranged to lie along the solid surface of the form between separate lines of perforations, then very little or no strain will be brought to bear on the bag which would tend to disrupt it.

In the operation of the apparatus the dirt and dust drawn into the dust chamber will be separated from the air by the dust separator and be deposited within the chamber from which it may be removed on removing its end piece 11. The matter deposited and accumulating within the dust chamber as the apparatus is used will not escape from the nozzle however it may be turned or manipulated. The plate or diaphragm 15 assists in such retention to a certain extent, but more especially is the matter retained by reason of the relatively small opening through the neck and the fact that air is passing through this opening at a very high velocity which tends at all times to keep the passage clean and the matter from escaping.

Referring now to the fixture on the dash of the automobile with which the pipe 2 connects leading from the suction member, and from which the pipe 5 leads to the manifold. This fixture comprises a valve casing 50 having within it a valve chamber 51. Extending from the forward end of the casing and preferably integral with it is a tubular extension 52 which extends through the dash. This extension is exterially threaded and arranged thereon outside the dash and tightening against the exterior face of the dash is a nut 53 which operates to hold the valve casing securely in place. The body of the casing is also provided on its under side with a hollow depending body extension 54 through which entrance is had into the chamber 51 of the casing. The upper part of the opening through this body extension is made conical in form and arranged within it with bearing against the inclined wall of the opening is a dust trap 55. The trap is held in place by the head 56 of a pipe section 57 which depends from the body extension 54. The head 56 is threaded to fit within the bottom end of the body extension with bearing against the dust trap holding it securely in place. The end of the pipe 2 is adapted to fit over the end of the pipe section 57 whereby the passage through the pipe is continued through the pipe section dust trap 55 and thence through the hollow of the body extension 54 into the chamber 51 of the valve casing.

The outlet from the chamber of the valve casing is by way of the passage 58 through the tubular extension 52, the outlet being continued through the pipe 5 the end of which fits within the tubular extension. The joint between the tubular extension and pipe 5 is sealed by a gland 59 held under compression by a cap 60 arranged upon the pipe 5 and threaded on to the end of the extension 52.

Entrance to the passage 58 is controlled by a valve 61 arranged to engage a valve seat 62 formed within the valve casing at the entrance to the passage 58. 63 represents the stem of the valve having an enlargement 64 exterially threaded and arranged to turn within an interially threaded opening 65 in the front wall of the valve casing. The enlargement 64 of the valve stem and opening 65 within which it turns is larger than the valve so that the valve may be inserted through this opening. Beyond the enlargement 64 the valve stem is provided with a stem extension 66 bearing upon its end a thumb piece 67 by which the stem and valve may be turned and the valve thereby moved in or out into an engaging or disengaging position with relation to the valve seat. To assist in maintaining a tight joint in the threaded connection between the enlarged portion 64 of the valve stem and the opening within which it turns, and for the purpose also of holding the valve securely in place when open or closed, a relatively powerful spring 68 is interposed between the thumb piece 67 and the adjacent end of the valve casing which is preferably provided with a socket 69 within which the end of the spring is contained.

When the vacuum cleaning apparatus is not in use the valve is turned to a closed position or it may be left open or partially open for the purpose of letting auxiliary air into the manifold. Normally the valve is turned to a closed position. When the cleaning apparatus is to be used, after the attachment of the pipe 2 to the fixture the valve is moved to a full open position when communication will be had through all of the connections to the manifold. The dust strainer 55 operates to catch any dust or dirt entering the fixture although there is very little chance for this when the vacuum apparatus is being operated inasmuch as no dust or dirt can penetrate the dust separator arranged within the chamber of the nozzle. Any dust or dirt caught by the dust trap 54 will readily escape by gravity through the end of the pipe section 57 when the pipe 2 is removed, the vibration of the vehicle tending to dislodge it. The sand trap 54 is readily cleaned at any time by unscrewing the pipe section 57 and removing the trap.

Having thus fully described my invention, I claim and desire to secure by Letters Patent of the United States:

1. In a vacuum cleaner, a suction member having an elongated chambered body with inlet and outlet openings in opposite ends thereof, an end piece having a flange bearing against the outlet end of said body around the opening in it, a part fitting inside the body functioning to centre the end piece, said end piece having a portion provided with a spiral slot, said end piece having also an opening through it and pipe connections extending said opening from the front and back of the end piece, the inner pipe section being provided with a dust separator, and a member on said body adjacent the slotted portion of the end piece extending into the slot therein whereby it will co-operate with said slotted portion of the end piece to form a screw connection.

2. In a vacuum cleaner, a suction member having an elongated chambered body with inlet and outlet openings in opposite ends thereof, an end piece closing said outlet opening, said end piece having a passage through it and provided with a pipe section lying within the chamber of said body and through which said passage is extended, a dust separator contained within the chamber of said body and making closed connection with the passage through said pipe section and end piece, the said dust separator comprising an elongated hollow perforated rigid fixture having threaded connection with said pipe section, and a dust screen enveloping said fixture, with its end embracing said pipe section, and means for securing said end of the screen to the pipe section.

HARMON R. MADDOCKS.